US008880126B2

(12) United States Patent
Fu et al.

(10) Patent No.: US 8,880,126 B2
(45) Date of Patent: Nov. 4, 2014

(54) METHOD AND SYSTEM FOR WIRELESS LAN NETWORK DETECTION

(75) Inventors: Guangrui Fu, Sunnyvale, CA (US); Fujio Watanabe, Union City, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1915 days.

(21) Appl. No.: 11/638,750

(22) Filed: Dec. 13, 2006

(65) Prior Publication Data

US 2007/0140157 A1  Jun. 21, 2007

Related U.S. Application Data

(60) Provisional application No. 60/752,994, filed on Dec. 21, 2005.

(51) Int. Cl.
*H04M 1/00* (2006.01)
*H04B 1/38* (2006.01)
*H04W 4/00* (2009.01)
*H04W 36/00* (2009.01)
*H04W 40/00* (2009.01)
*H04W 48/18* (2009.01)
H04W 84/04 (2009.01)
H04W 84/12 (2009.01)
H04W 88/06 (2009.01)

(52) U.S. Cl.
CPC ............ *H04W 48/18* (2013.01); *H04W 84/042* (2013.01); *H04W 84/12* (2013.01); *H04W 88/06* (2013.01); *Y02B 60/50* (2013.01)
USPC ........ 455/574; 455/432.3; 455/439; 455/445; 370/331; 370/338

(58) Field of Classification Search
CPC ..... H04W 36/00; H04W 36/08; H04W 36/14; H04W 36/16; H04W 36/34; H04W 36/38; H04W 40/00; H04W 48/00; H04W 48/18; H04W 48/20; H04W 52/00; H04W 52/02; H04W 52/0209; H04W 52/0212; H04W 52/0261; H04W 52/0274; H04W 52/028; H04M 2250/00; H04M 2250/06; H04M 1/73; G06F 1/32; G06F 1/3203; G06F 1/3287; Y02B 60/10; Y02B 60/12; Y02B 60/1278; Y02B 60/18; Y02B 60/186; Y02B 60/40; Y02B 60/50
USPC ................... 455/574, 418–420, 432.1–432.3, 455/435.1–445; 370/331, 338
See application file for complete search history.

(56) References Cited

U.S. PATENT DOCUMENTS 5,949,776 A  9/1999 Mahany et al.
6,754,194 B2  6/2004 Ramaswamy et al.
(Continued)

OTHER PUBLICATIONS

IEEE Standard for Information Technology—Telecommunications and information exchange between systems—Local and metropolitan area networks—Specific requirements—Part 11: "Wireless LAN Medium Access Control (MAC) and Physical Layer ( PHY) Specifications"; IEEE Std 802.11; Copyright Jun. 12, 2007; pp. 1184.

(Continued)

*Primary Examiner* — Michael Mapa
(74) *Attorney, Agent, or Firm* — Haynes and Boone, LLP

(57) ABSTRACT

A method and a system discover a wireless LAN network for a multi-mode handset in a power-efficient way. The method extends stand-by time for the cellular and wireless LAN multi-mode handset, taking advantage of that fact that the cellular interface demands less energy from the battery than the wireless LAN (WLAN)-based interface in such a handset. The method therefore uses the cellular interface as an always-on proxy for the wireless LAN interface to receive the initial packets of a communication session, and uses the initial packet or packets to activate the handset's interface with the wireless LAN.

6 Claims, 6 Drawing Sheets

(56) References Cited

U.S. PATENT DOCUMENTS

| | | | |
|---|---|---|---|
| 6,917,598 | B1 | 7/2005 | Emeott et al. |
| 6,931,249 | B2 | 8/2005 | Fors et al. |
| 6,940,844 | B2 | 9/2005 | Purkayastha et al. |
| 2003/0134638 | A1 | 7/2003 | Sundar et al. |
| 2003/0169727 | A1* | 9/2003 | Curry et al. ............... 370/352 |
| 2003/0236892 | A1* | 12/2003 | Coulombe ................ 709/228 |
| 2005/0282541 | A1* | 12/2005 | Iizuka et al. ............. 455/426.2 |
| 2006/0089169 | A1* | 4/2006 | Tsao et al. ............... 455/552.1 |
| 2006/0116127 | A1* | 6/2006 | Wilhoite et al. ........... 455/442 |
| 2006/0209794 | A1* | 9/2006 | Bae et al. ................ 370/352 |

OTHER PUBLICATIONS

Wu, Gang; Mizuno, Mitsuhiko; Havinga Paul J.M.; "MIRAI Architecture for Heterogeneous Network"; IEEE Communications Magazine; Copyright Feb. 2002; pp. 126-134.

Steinback, Carl; "A Reinforcement-Learning Approach to Power Management"; www.ai.mit.edu; A1 Technical Report; Copyright May 2002; pp. 41.

Flinn, Jason; Satyanarayanan, M.; "Managing Battery Lifetime with Energy-Aware Adaptation"; ACM Transactions on Computer Systems; vol. 22, No. 2; Copyright May 2004; pp. 137-179.

Kravets, Robin; Krishnan, P.; "Application-Driven Power Management for Mobile Communication"; Wireless Networks 6; Copyright 2000; pp. 263-277.

Peterson, Jon; "Enum Service Registration for Session Initiation Protocol (SIP) Addresses-of-record"; RFC 3764; www.neustar.biz; Copyright Apr. 2004; pp. 8.

Patrik, Faltstrom; Mealling, Michael; "The E.164 to Uniform Resource Identifiers (URI) Dynamic Delegation Discovery system (DDDS) Application (ENUM)"; RFC 3761; www.ietf.org/ipr.; www.verisignlabs.com; Copyright Apr. 2004; pp. 17.

Rosenberg, J.; Schulzrinne, H.; Camarillo, G.; Johnston, A.; Peterson, J.; Sparks, R.; Handley, M.; Schooler, E.; "SIP: Session Initiation Protocol"; RFC 3261; Copyright Jun. 2002; pp. 110.

* cited by examiner

METHOD AND SYSTEM FOR WIRELESS LAN NETWORK DETECTION

CROSS REFERENCE TO RELATED APPLICATIONS

The present application is related to and claims priority of U.S. Provisional Patent Application ("Provisional Application"), entitled "Method and Apparatus for Wireless LAN Network Detection," Ser. No. 60/752,994, and filed on Dec. 21, 2005. The Provisional Application is hereby incorporated by reference in its entirety.

BACKGROUND OF THE INVENTION

1. Field of the Invention

The present invention is related to mobile communication devices. In particular, the present invention relates to multi- or dual-mode wireless devices capable of both cellular and wireless local area network (WLAN) communications.

2. Discussion of the Related Art

Multimode or dual-mode handsets (i.e., handsets capable of both cellular and wireless LAN communications) have becoming popular recently. As homes, enterprises, and cities deploy wireless LAN networks, dual-mode handsets allow users to enjoy wide-area coverage mobility, faster networks, higher access rates and cheaper prices for both indoors and outdoor uses. Meanwhile, more Internet-based applications are ported to and run on dual-mode handsets; such applications include, for example, web browsing and Voice-over-IP (VoIP) applications. Therefore, users of multimode or dual-mode handsets may enjoy Internet access wherever they have broadband wireless access.

Although WLANs offer higher speed network access and cheaper services, wireless LAN communication requires higher power than cellular or cordless phones. Power consumption is a critical design consideration for handheld and other power resource-constrained devices. Prior art power management schemes in wireless LAN networks are known. For example, the IEEE 802.11 standard defines three basic modes for power management in wireless LAN networks: "wake-up" mode, "sleep" mode (also known as "dormant" mode), and power-save poll mode. In the IEEE 802.11 standard, there are two schemes for switching among these three modes: automatic power save delivery (APSD), and unscheduled automatic power save delivery (U-APSD) (See, for example, U.S. Pat. No. 6,917,598, entitled "Unscheduled Power Save Delivery Method In A Wireless Local Area Network For Real Time Communication," issued on Jul. 12, 2005). Under the APSD scheme, the WLAN client switches from sleep mode to wake-up mode periodically to receive packets that have been buffered at an access point (AP) while the WLAN client is in sleep mode. In the U-APSD scheme, the WLAN client wakes up when it has packets to send out via an uplink, or when it expects to receive packets via a downlink. Once in the "awake" mode, the WLAN client notifies the AP to forward to it all packets that have been buffered while the WLAN client is in the sleep mode, and switches back to the sleep mode once the AP has sent all buffered packets.

Mode switching in the APSD and U-APSD schemes involves both the WLAN client and the WLAN AP, with the aim of minimizing the necessary wake-up time. Alternatively, a third scheme requires modification in the WLAN client only. Under that third scheme, a portion of the components within the WLAN client circuit is kept in an active mode to detect the RF signals from nearby APs, while the remainder of the WLAN client circuit is placed in the sleep mode until a strong WLAN RF signal is detected. (See, e.g., U.S. Pat. No. 6,754,194, entitled "Method and Apparatus for Indicating the Presence of a Wireless Local Area Network by Detecting Signature Sequences," issued on Jun. 22, 2004.)

Because the mode-switching operation itself consumes significant power, when the number of packets that need to be delivered via wireless LAN is small, or when packet delivery is not synchronized with the mode-switching frequency, the power consumed due to frequent mode-switching under APSD is wasteful or the resulting response time may be delayed. Under a U-APSD scheme, when the number of packets to be sent is small, the application response time is delayed. For example, an incoming VoIP call would have to be buffered until a client has an outgoing packet to deliver.

Other research works disclose using application-specific power usage pattern to predict and adjust the processor speed to conform to the application's requirement and to adjust battery usage at the right level. See, for example, the article "Managing battery lifetime with energy-aware adaptation," by Jason Flinn and M. Satyanarayanan, ACM Transactions on Computer Systems (TOCS), v. 22n. 2, p. 137-179, May 2004. Another example may be found in the article "Application-driven power management for mobile communication," by Robin Kravets and P. Krishnan, published in Proceedings of the Fourth Annual ACM/IEEE International Conference on Mobile Computing and Networking (MobiCom) (Dallas, Tex., October 1998). Similarly, the Master's thesis (Mechanical Engineering), entitled "A reinforcement-learning approach to power management," by C. Steinbach, in AI Technical Report, M. Eng Thesis, Artificial Intelligence Laboratory, MIT, May 2002, teaches using historic battery usage patterns of a device to predict its future power usage, and therefore to adjust the power mode to the appropriate level.

Using application-specific data or historical power requirement data to predict future power requirement may not be accurate in many instances. Further, a wrong prediction may result in inefficient, excessive power or erroneous processor speed for a given application. Also, because adjustments to correct power consumption itself are power-consuming as well, unnecessary or frequently power adjustments drain power quickly.

Still other research works disclose inter-working between different radio interfaces. (See, e.g., the article "MIRAI Architecture for Heterogeneous Network, IEEE Communications Maganize, by G. Wu, M. Mizuno, P. Havinga, February 2002.) The MIRAI architecture includes a common core network that connects multiple radio access networks (RANs). Each RAN may be homogeneous or heterogeneous. MIRAI uses a common signaling channel, known as the "Basic Access Network (BAN)," to co-ordinate among various radio networks. The BAN also provides location updates, paging, wireless network discovery, and support for heterogeneous handoff. U.S. Pat. No. 6,940,844, entitled "Method and apparatus for reporting WLAN capabilities of a dual mode GPRS/WLAN or UMTS/WLAN WTRU" presents a method for exchanging information regarding the network and terminal capabilities across the two network interfaces of dual-mode mobile terminals, so that service can be delivered to the terminal using the best interface and network. Other inter-working related prior art includes heterogamous handoffs. For example, U.S. Pat. No. 6,931,249, entitled "Method and apparatus for a target-initiated handoff from a source cellular wireless network to a target non-cellular wireless network" introduces a method to hand over from a cellular network to a non-cellular network.

MIRAI, however, remains a conceptual architecture. For control purpose, MIRAI requires a dedicated, common channel to be shared by all other radio interfaces. Current dual-mode handset systems lack such a dedicated, common channel to be used for control purpose. Further, in many cases, the cellular and the WLAN interfaces do not share the same core network as well.

SUMMARY OF THE INVENTION

When both cellular and WLAN networks are available, a user usually prefers to use the WLAN network because of the higher data rate and the lesser cost relative to the cellular network. However, a WLAN network typically has a smaller coverage area than a cellular network. The WLAN coverage is also often available only in limited and discontinuous areas, such as inside an office, at home, or at a hotspot. Therefore, one overhead cost in using WLAN services is the cost of discovering network boundaries or availability. To discover a WLAN network boundary requires the WLAN interface to be active. In a dual mode handset, the WLAN interface has a greater demand on power from the battery than the cellular interface. To justify a multi- or dual-mode cell phone over a single-mode cell phone, a reduction of the energy requirement at the WLAN interface is desired.

In accordance with one embodiment of the present invention, a dual-mode handset (i.e., with interfaces to both cellular and WLAN networks) discovers a WLAN network in an energy efficient way. Thus, the present invention can extend stand-by time for a dual-mode handset. For example, instead of keeping the WLAN interface in a dual-mode handset always active, or becoming active periodically, one embodiment of the present invention switches on the WLAN interface on demand. That is, the WLAN interface becomes active only when it is needed for a telephone call, or to respond to a message for an application on the WLAN network. In that embodiment, the cellular interface acts as a proxy "always on" interface for the WLAN interface, and delivers the first packet or packets of the telephone call or the application. These first packets may be, for example, the SIP INVITE message in a SIP-based VoIP application. Upon receiving these first packets, the cellular interface causes the WLAN interface to be activated. The WLAN interface may then search for a near-by AP of an available WLAN network. Upon finding such a network, a SIP REPLY message and the subsequent communication are carried over the WLAN link. The WLAN interface may return to sleep or inactive mode upon completing the telephone call or the application.

The present invention allows a dual mode mobile terminal to discover a WLAN service area in a power efficient way, taking advantage of an always-on, wide coverage, low power cellular interface as a proxy for the WLAN interface for the initial packet or packets of a WLAN based call. Under that arrangement, power consumption is significantly reduced because discovery of the WLAN occurs only when a telephone call or a required response is pending. The power consumed for switching between modes to discover the WLAN is avoided.

The present invention is better understood upon consideration of the detailed description below in conjunction with the accompanying drawings.

BRIEF DESCRIPTION OF THE DRAWINGS

To facilitate cross referencing among the figures, like elements are assigned like reference numerals.

DETAILED DESCRIPTION OF THE PREFERRED EMBODIMENTS

Figure 1:
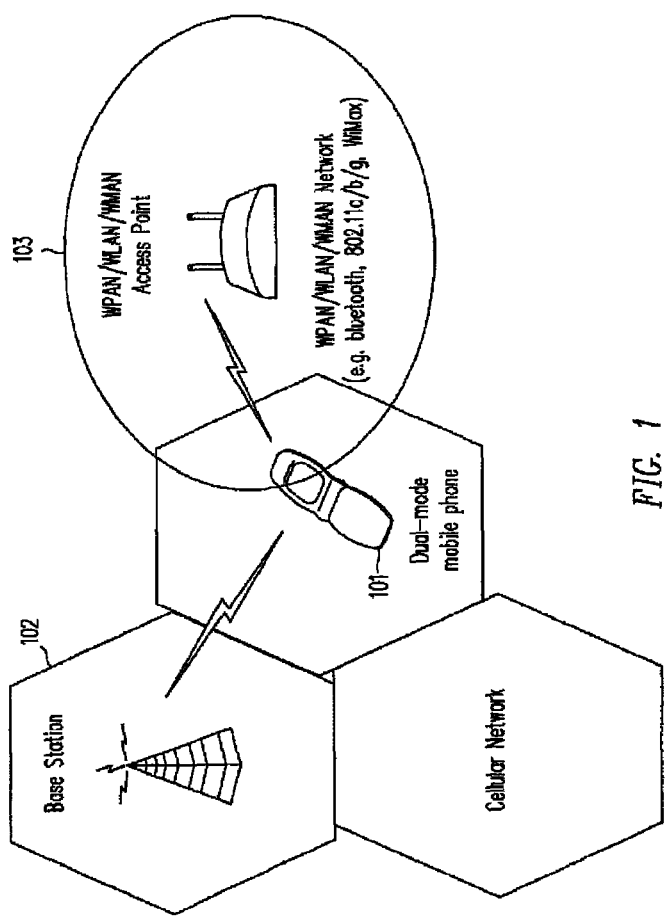
FIG. 1 shows mobile terminal 101 having two wireless interfaces to cellular network 102 and wireless computer network 103.

FIG. 1 shows mobile terminal 101 having wireless interfaces to cellular network 102 and wireless communication network 103. Mobile terminal 101 is internet protocol (IP) enabled and capable of session initiation protocol (SIP) based voice-over-IP (VoIP) communications. Cellular network 102 may be a W-CDMA, a CDMA 2000, or a GSM/GPRS network. Wireless computer network 103 may be a WLAN network operating under a 802.11a/b/g, a wireless personal area network (WPAN) (e.g., Bluetooth), or a wireless metro area network (WMAN) (e.g., WiMax or a 802.16 network), or another short-range, free licensed or unlicensed wireless network. Different identifications (IDs) may be associated with the different interfaces. For example, the ID may be a SIP ID[1], a traditional telephone number, or another global unique identification (e.g., crypto public key or certificate). In some instances, the service provider may provide the same common ID to two or more interfaces. However, in many instances, a mapping between IDs is required to allow the dual-mode handset to select which interface to use to handle a given telephone call or to respond to messages. SIP is a protocol widely used in establishing and managing sessions for various applications, such as VoIP, short message service (SMS), and Push-to-talk (PTT). SIP has been adopted as an Internet Engineering Task Force (IETF) standard, and as 3GPP and 3GPP2 standards. If a traditional phone number is used as the ID, the ENUM protocols[2] may be used to translate the telephone number into an SIP ID that may be used for SIP based communication. The telephone number to SIP ID translation may be carried out using, for example, ENUM-aware DNS servers[3]. If another global unique identification is used, a suitable naming translation mechanism is required to map the ID to a unique SIP ID.

[1] See, for example, IETF RFC 3261, SIP: Session Initiation Protocol, 2002.
[2] See, for example, IETF RFC 3764, Enum Service Registration for Session Initiation Protocol (SIP) Addresses-of-Record, 2004.
[3] IETF RFC 3761, The E.164 to Uniform Resource Identifiers (URI) Dynamic Delegation Discovery System (DDDS) Application (ENUM), 2004.

Figure 2:
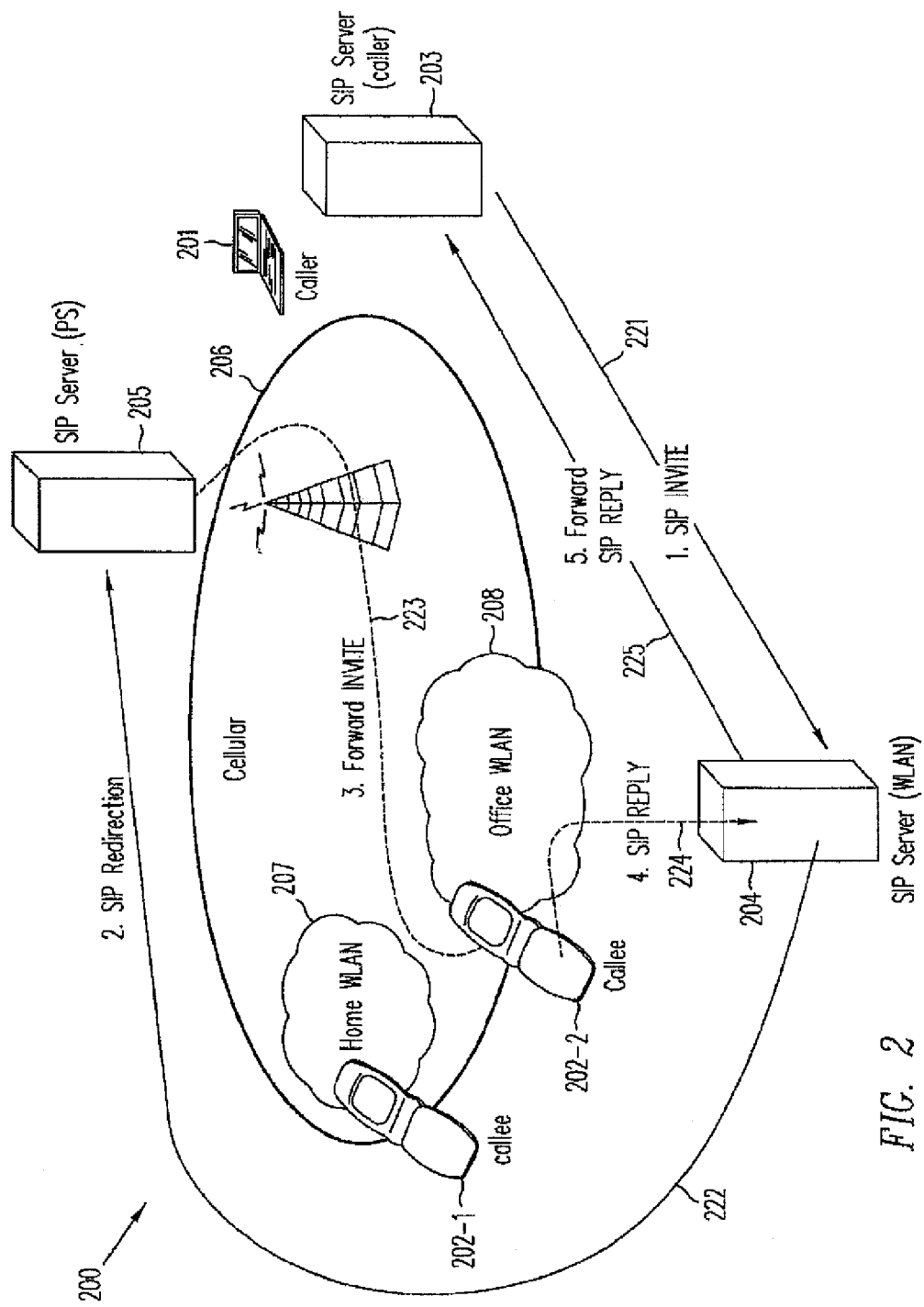
FIG. 2 shows network architecture 200 that facilitates dual-mode handset operations, according to one embodiment of the present invention

FIG. 2 shows network architecture 200 that facilitates dual-mode handset operations, according to one embodiment of the present invention. As shown in FIG. 2, network architecture 200 includes cellular system 206, a wide area network (e.g., the Internet) and WLANs 207 and 208. Mobile terminals 201-1 and 202-2 are dual-mode handsets with cellular interfaces to cellular system 206 and wireless WLAN interfaces to WLANs 207 and 208, respectively. The wide area network includes SIP servers 203, 204 and 205, and other related network elements (not shown, e.g., DNS servers, wireless network access points and access routers). Cellular system 206 includes a number of cellular base stations. One or more corresponding hosts (e.g., caller 201) may communicate with each of mobile terminals 201-2 and 202-2. A corresponding host may be a wired network host, or single-mode or multi-mode wireless host. The corresponding host may be a SIP-capable or a traditional PSTN telephone. If the corresponding host is a traditional PSTN telephone, a PSTN-SIP gateway (not shown) is required to translate signaling between the PSTN telephone networks and the SIP network. Domain Name System (DNS) servers may be used by SIP servers to look up IP addresses of other SIP servers, and for SIP user agents, using ENUM protocols, to map the telephone number to the SIP server serving the telephone number.

In accordance with one embodiment of the present invention, SIP servers 203-205 establish and manage sessions between the two end-hosts (e.g., caller 201 and either one of mobile terminals 202-1 and 202-2). SIP servers 203-205 locate the end-hosts, relay the signaling messages between the two end-hosts, and may also route data messages between the end-hosts, when required. In addition, SIP server 204 further (a) maintains a record of the SIP ID of the cellular interface associated with each mobile terminal, (b) maintains a record of the network interface status for each SIP ID it serves, (c) communicate with the SIP user agent to update the interface status (notification may be carried out, for example, by a SIP registration message), and (d) redirect the message to the SIP server for the cellular SIP ID if the WLAN interface is in a sleep state.

Mobile terminals 201-1 and 202-2 each (a) notify its SIP server about its interface status: inactive (i.e., "sleep") or active (notification may be carried out, for example, by a SIP registration message), (b) notify its SIP server about the SIP ID of its other wireless interface (e.g., cellular), and (c) switch the WLAN interface between sleep and active states on demand (the demand response mechanism may be integrated into a network interface device driver. a network stack or an OS kernel program).

Figure 3:
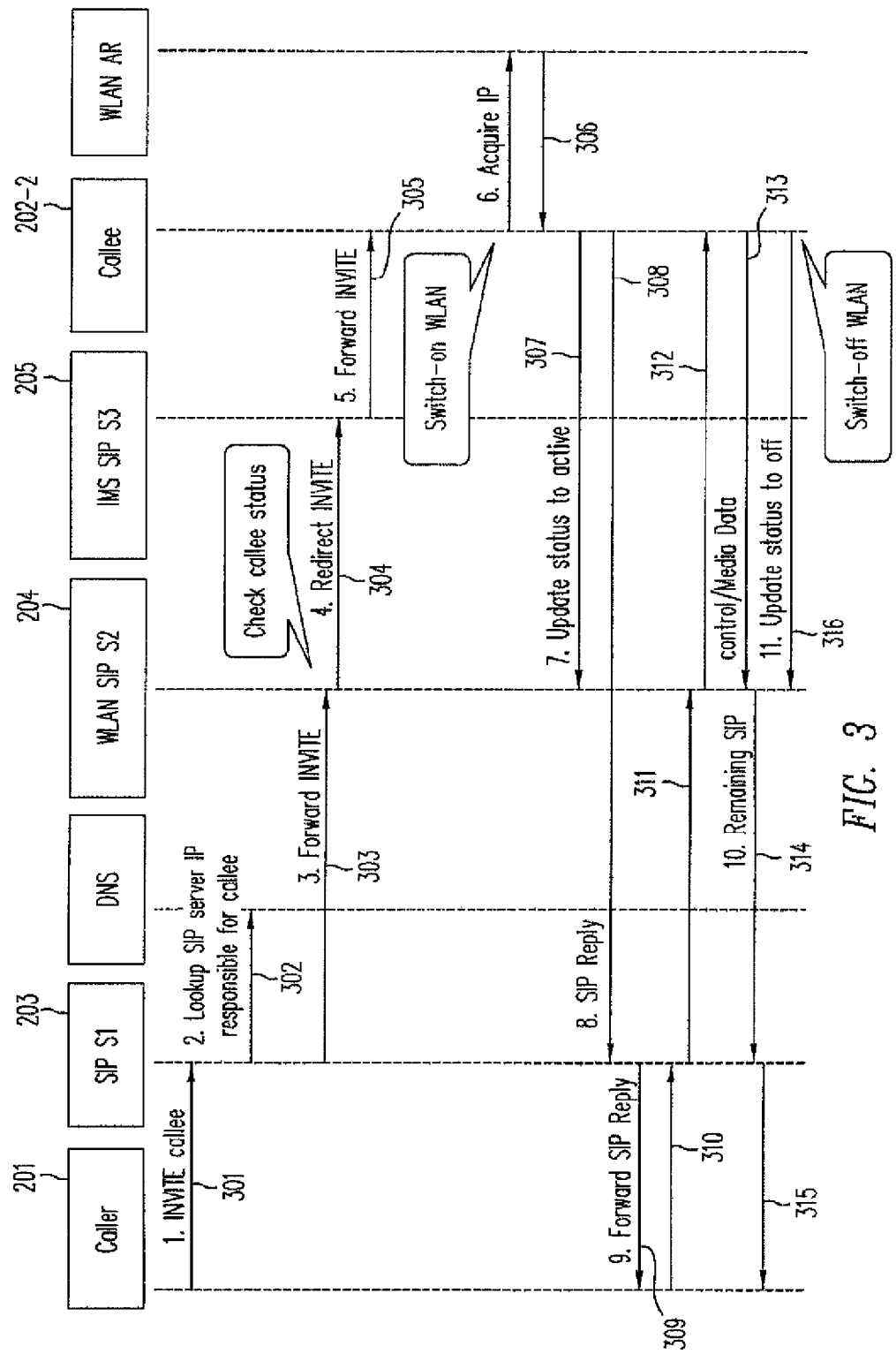
FIG. 3 illustrates a protocol sequence for handling an SIP-based telephone call, in accordance with one embodiment of the present invention.

FIG. 3 illustrates a protocol sequence for handling an SIP-based telephone call, in accordance with one embodiment of the present invention. Referring to FIGS. 2 and 3, in a SIP-based VoIP application, for example, SIP-capable caller 201 initiates the SIP session with one of mobile terminals 202-1 and 202-2 (say, mobile terminal 202-2). Initially, caller 201 obtains (e.g., via DNS) an IP address of the SIP server that serves the network in which caller 201 is located (e.g, SIP server 203). Caller 201 then calls mobile terminal 202-2 at its WLAN ID number using VoIP. Such a call is initiated by caller 201 sending through SIP server 203 an SIP INVITE message to SIP server 204 (shown as step 221 in FIG. 2 and steps 301-303 in FIG. 3), which services mobile terminal 202-2. To identify SIP server 204 which services mobile terminal 202-2, SIP server 203 may use a DNS service or an ENUM service (Step 302 of FIG. 3). SIP server 204 keeps track of a status of the WLAN interface of mobile terminal 202-2, and an ID of mobile terminal 202's cellular interface. For a message that is addressed to mobile terminal 202-2's WLAN ID, if the interface status shows that mobile terminal 202-2's WLAN interface is active, the message is routed to mobile terminal 202-2's WLAN interface directly. Otherwise, as in the case shown in FIGS. 2 and 3, the message is redirected to SIP server 205, which services the cellular network communicating with mobile terminal 202-2's cellular interface (step 222 in FIG. 2, and step 304 of FIG. 3).

When SIP server 205 receives the redirected SIP INVITE request from SIP server 204, SIP server 205 may accept or may reject the redirected SIP INVITE request. If SIP server 205 accepts the request, the message is forwarded to mobile terminal 202-2's cellular interface over cellular network 206, based on the ID of mobile terminal 202-2's cellular interface (Step 223 of FIG. 2 and step 305 of FIG. 3). If the same ID is assigned to both the cellular and the WLAN interfaces, SIP server 204 and SIP server 205 may reside in the same physical server, and an explicit redirection of the SIP INVITE message is not necessary. SIP server 204 still needs to maintain the interface status of mobile terminal 202-2's WLAN interface. The message is forwarded to mobile terminal 202-2's cellular interface, addressed to mobile 202-2's WLAN interface.

As mobile terminal 202-2 receives the message, mobile terminal 202-2 powers up its WLAN interface and moves from the sleep state to the awake or active state. The WLAN interface tries to find beacon signals from a nearby AP and to acquire an IP address (message exchange 306 of FIG. 3). Once mobile terminal 202-2's WLAN interface associates with an AP, the WLAN interface informs SIP server 204 of its change in status from sleep mode to active mode (step 307 of FIG. 3) and sends a SIP reply message from its WLAN interface to caller 201 via caller's SIP server 203 (steps 308 and 309 of FIG. 3). The message exchanges (including control and data) in the remainder of the SIP session between mobile terminal 202-2 and caller 201 are communicated between the WLAN interface of mobile terminal 202-2 and caller 201 via SIP servers 203 and 204 (steps 310-315 of FIG. 3). When the SIP session is finished, for example, a SIP EXIT message or SIP BYE message is sent to or received from caller 201. At that time, mobile terminal 202-2 turns off its WLAN interface after updating its status in its SIP server 204 accordingly (i.e., from the active mode to the sleep mode; step 316 of FIG. 3).

At step 316 of FIG. 3, if mobile terminal 202-2 cannot find a nearby AP, the SIP reply message and the subsequent message exchanges between mobile terminal 202-2 and caller 201 are all forwarded through mobile terminal 202-2's cellular interface. Alternatively, mobile terminal 202-2 may drop out as an unreachable destination, depending on caller 201's local policy configuration.

Figure 4:
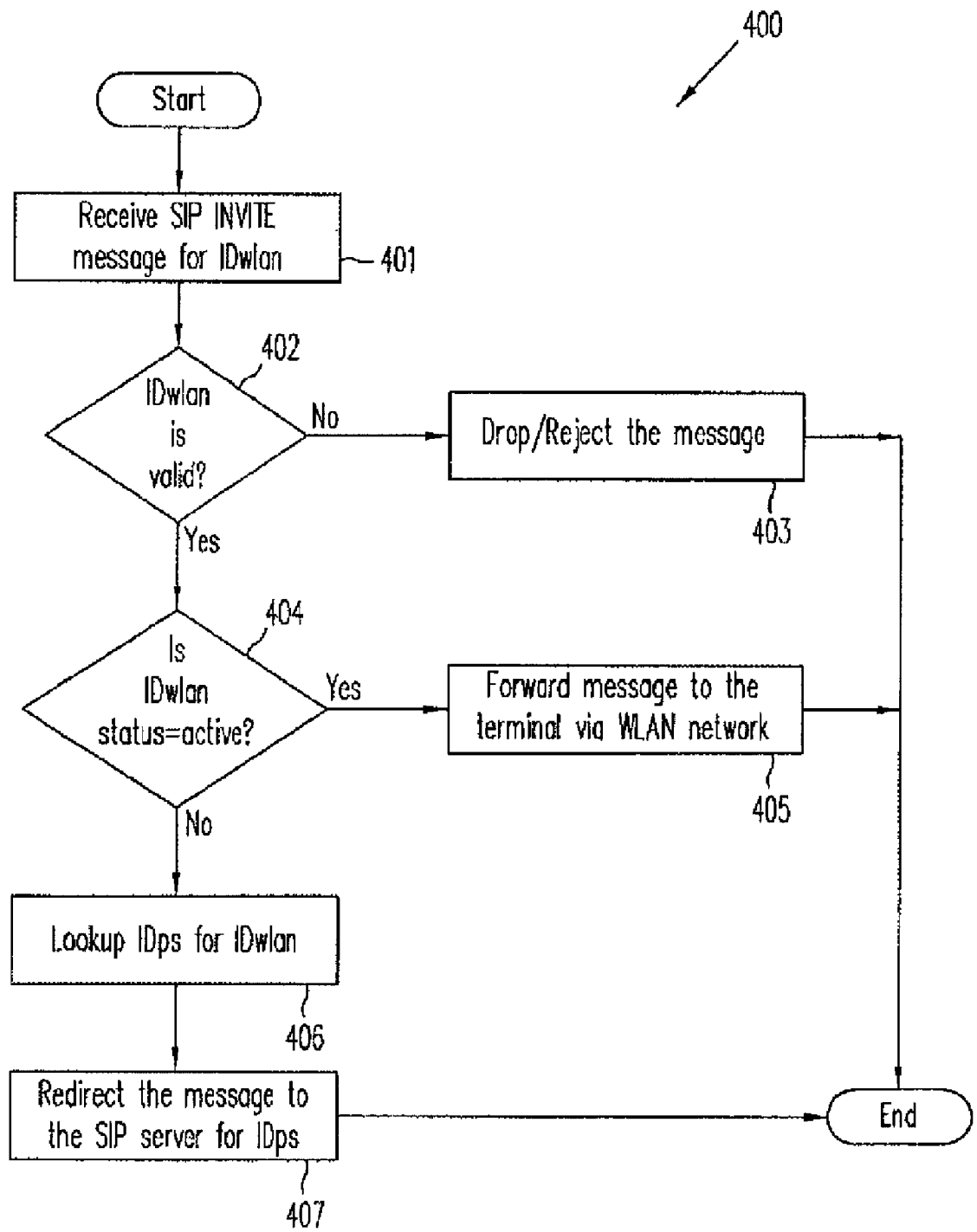
FIG. 4 shows procedure 400 carried out by SIP server 204, which provides SIP services for the WLAN network in which mobile terminal 202-2 is located.

FIG. 4 shows procedure 400 for SIP server 204, which provides SIP services for the WLAN network in which mobile terminal 202-2 is located. As mentioned above, SIP server 204 maintains the power status of each mobile terminal associated with it, and redirects messages to other SIP servers. When SIP server 204 receives a SIP INVITE message (step 401), SIP server 204 verifies that the SIP INVITE message is addressed to a valid SIP ID (indicated as IDwlan in FIG. 4) associated with it (step 402). If the SIP ID is not a valid ID, the SIP INVITE message is dropped silently or rejected (step 403). When IDwlan is validated, server 204 checks the status of the WLAN interface associated with IDwlan (step 404). In one embodiment, the status of the WLAN interface of IDwlan can be either "sleep" or "active". If the status is active, SIP server 204 delivers the message to the IP address associated with IDwlan (step 405). Otherwise (i.e., the status is "sleep") SIP server 204 looks up the cellular ID of mobile terminal 202-2 (step 406, indicated as IDps in FIG. 4), and redirects the message to SIP server 205 that serves the cellular network (step 407).

Figure 5:
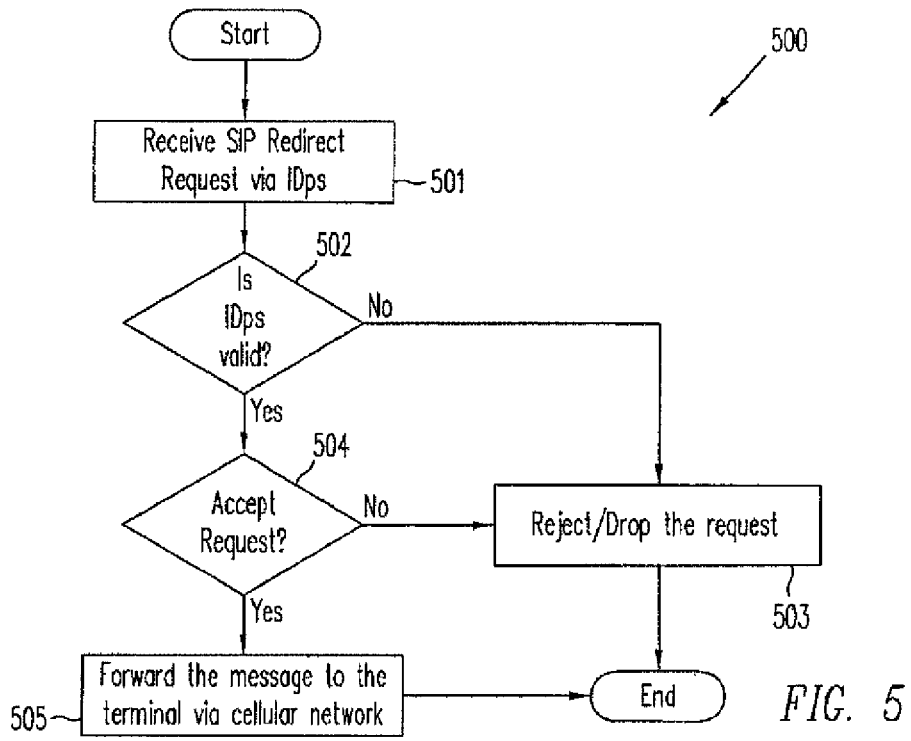
FIG. 5 shows procedure 500 of SIP server 205 which provides SIP services for cellular network 206 in which mobile terminal 202-2 subscribes to services that relay a SIP message from other SIP servers to mobile terminal 202-2.

FIG. 5 shows procedure 500 of SIP server 205 which provides SIP services for cellular network 206 in which mobile terminal 202-2 subscribes to services that relay a SIP message from other SIP servers to mobile terminal 202-2. After SIP server 205 receives a redirected message (step 501), SIP server 205 verifies at step 502 if the ID is valid (i.e., if it is an ID server 205 serves). Also, SIP serve 205 may also check the source of the redirected message. For example, if the source (i.e. SIP server 204) is from a partner provider, SIP 205 may accept the request (step 503). Otherwise, i.e., if the redirected message is from an unknown or competitor provider, SIP server 205 may reject the request. If the request is accepted (step 505), the redirected message is delivered to mobile terminal 202-2 via cellular network 206.

Figure 6:
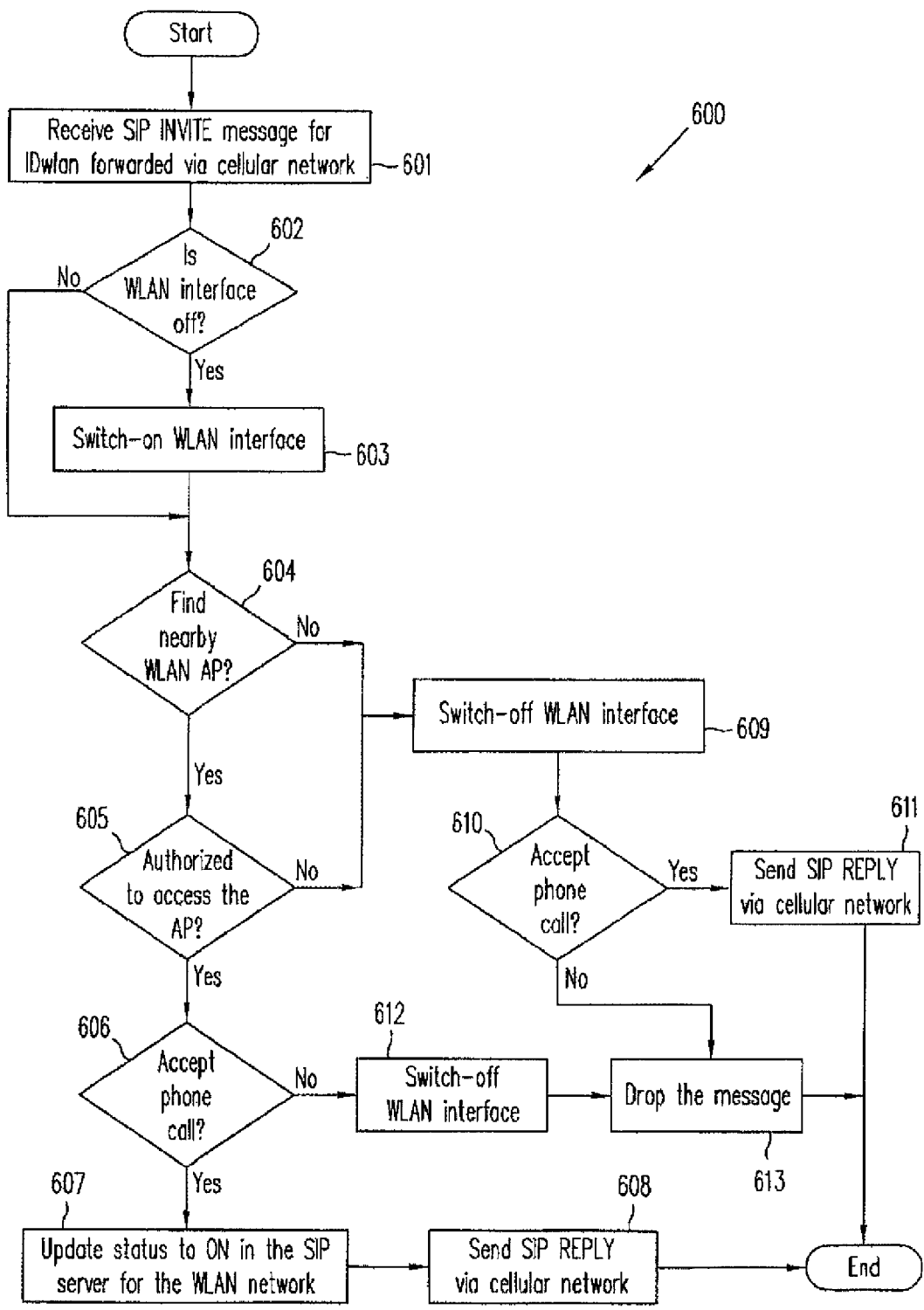
FIG. 6 shows procedure 600 in dual-mode mobile terminal 202-2 for determining when and how to turn the WLAN interface of mobile terminal 202-2 into an active state from the cellular interface.

FIG. 6 shows procedure 600 in dual-mode mobile terminal 202-2 for determining when and how to turn the WLAN interface of mobile terminal 202-2 into an active state from the cellular interface. In one implementation, procedure 600 can be integrated with a device driver program for the cellular interface for mobile terminal 202-2. When a first message of an SIP session (e.g. SIP INVITE) is received into the cellular interface (step 601), mobile terminal 202-2 checks at step 602 if the message is addressed to its WLAN interface. If so (i.e., step 603), mobile terminal 202-2 turns on the WLAN interface if it is in the sleep state and searches for a nearby WLAN network (step 604). If mobile terminal 202-2 finds a WLAN network and is authorized to use the WLAN network (step 605), and mobile terminal 202-2 decides to accept a telephone call (step 606), mobile terminal 202-2 sends an SIP registration message to its SIP server (e.g., SIP server 204) for its WLAN interface to update its IP address and interface status via the wireless LAN network. A SIP reply message and the conversation are delivered over the wireless LAN network (step 608). If no appropriate WLAN AP is found at step 604, or terminal 202-2 decides not to answer the telephone call (step 612), the WLAN interface of mobile terminal 202-2 is turned off (i.e., put to "sleep" mode, step 612). A user may be prompted over the cellular interface to determine whether or not to accept the telephone call instead (step 611), if no WLAN network available, or reject the conversation (step 613).

Figure 7:
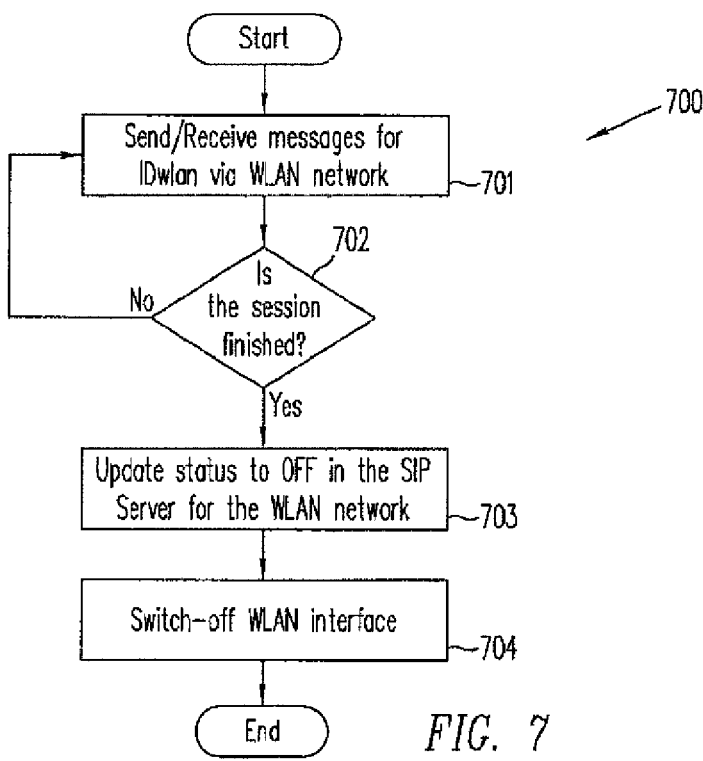
FIG. 7 shows procedure 700 in dual-mode terminal 202-2 to determine when and how to turn the WLAN interface back to the sleep mode.

FIG. 7 shows procedure 700 in dual-mode terminal 202-2 to determine when and how to turn the WLAN interface back to the sleep mode. In one implementation, procedure 700 can be integrated with a device driver program for the WLAN interface for the mobile terminal. When mobile terminal 202-2 receives or sends its last message of the session (e.g. SIP EXIT or BYE message, step 702), mobile terminal 202-2 sends an SIP registration message to SIP server 204 which serves its WLAN interface to update its network status (to "sleep", step 703) via the WLAN network, and switch off the interface afterwards (step 704).

The above detailed description is provided to illustrate the specific embodiments of the present invention and is not intended to be limited. Numerous variations and modifications within the scope of the present invention are possible. The present invention is set forth in the following claims.

We claim:

1. A method for a power-efficient communication device having a wireless local area network (WLAN) interface for connecting to a WLAN and a cellular interface for connecting to a cellular network, the WLAN interface and the cellular interface each being capable of communicating using the Session Initiation Protocol (SIP), the method comprising:
   receiving a first status update from the communication device at a first SIP server serving the WLAN interface, the first status update indicating that the WLAN interface is deactivated;
   relaying a first SIP INVITE message received at the first SIP server to a second SIP server serving the cellular interface in response to the indication that the communication device is deactivated;
   receiving a second status update from the communication device at the first SIP server, the second status update indicating that the WLAN interface is activated; and
   forwarding a second SIP INVITE message received at the first SIP server directly through the WLAN to the WLAN interface in response to the indication that the WLAN interface is activated.

2. A method as in claim 1, further comprising, subsequent to the receipt of the second SIP INVITE message, carrying out a telephone call over the WLAN.

3. A method as in claim 1, wherein connecting the WLAN interface to the WLAN comprises:
   searching for an access point of the WLAN; and
   obtaining an internet protocol address from the access point.

4. A method as in claim 1, further comprising: subsequent to the receipt of the first SIP INVITE message, carrying out a telephone call over the cellular network.

5. A method as in claim 1, wherein deactivating the WLAN interface comprises powering down the WLAN interface.

6. A method for providing SIP service to a dual-mode communication device having a wireless local area network (WLAN) interface for connecting to a WLAN and a cellular interface for connecting to a cellular network, the WLAN interface and the cellular interface each being capable of communicating using the Session Initiation Protocol (SIP), the method comprising:
   transmitting a first status update from the communication device to a first SIP server serving the WLAN interface, the first status update indicating that the WLAN interface is deactivated;
   while the WLAN interface is deactivated, receiving at the cellular interface a first SIP INVITE message from a second SIP server serving the cellular interface, wherein the first SIP INVITE message was relayed through the first SIP server;
   transmitting a second status update from the communication device to the first SIP server, the second status update indicating that the WLAN interface is activated; and
   while the WLAN interface is activated, receiving at the WLAN interface a second SIP INVITE message from the first SIP server.

\* \* \* \* \*